United States Patent [19]

Mitchell et al.

[11] 4,251,860
[45] Feb. 17, 1981

[54] VIRTUAL ADDRESSING APPARATUS EMPLOYING SEPARATE DATA PATHS FOR SEGMENT AND OFFSET PORTIONS OF A VIRTUAL ADDRESS AND UTILIZING ONLY THE OFFSET PORTION TO CALCULATE VIRTUAL ADDRESS

[75] Inventors: Glen R. Mitchell, Pine Island; Frank G. Soltis, Rochester; Roy L. Hoffman, Pine Island, all of Minn.

[73] Assignee: International Business Machines Corporation, Armonk, N.Y.

[21] Appl. No.: 953,676

[22] Filed: Oct. 23, 1978

[51] Int. Cl.³ ............................................. G06F 9/32
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,454,934 | 7/1969 | Bahrs et al. | 364/200 |
| 3,461,433 | 8/1969 | Emerson | 364/200 |
| 3,614,746 | 10/1971 | Klinkhamer | 364/200 |
| 3,725,874 | 4/1973 | Van Heel | 364/200 |
| 3,731,283 | 5/1973 | Carlson et al. | 364/200 |
| 3,764,996 | 10/1973 | Ross | 364/200 |
| 3,787,813 | 1/1974 | Cole et al. | 364/200 |
| 3,818,460 | 6/1974 | Beard et al. | 364/200 |
| 3,938,096 | 2/1976 | Brown et al. | 364/200 |
| 3,949,378 | 4/1976 | Crabb et al. | 364/200 |
| 4,054,945 | 10/1977 | Ichiko et al. | 364/200 |
| 4,092,715 | 5/1978 | Scriver | 364/200 |
| 4,145,738 | 3/1979 | Inoue et al. | 364/200 |

OTHER PUBLICATIONS

Koch, "Block Address Scheme Based on Associative Memory Blocks" in *IBM Technical Disclosure Bulletin*, vol. 15, No. 10, Mar. 1973, pp. 3088-3090.

*Primary Examiner*—Melvin B. Chapnick
*Attorney, Agent, or Firm*—Kirkland & Ellis

[57] ABSTRACT

Virtual addressing apparatus for implementing a large virtual address in a computer system having narrow data paths, ALU, and local storage register arrays without requiring multiple passes. The virtual addressing apparatus stores the segment portion of a virtual address in a segment register and the offset portion of the virtual address in an offset register. To form a new virtual address, a new offset value is obtained by adding the displacement value given by the instruction in the instruction buffer register to the offset value stored in the offset register. The segment portion of the virtual address does not participate in the arithmetic operation for forming the new virtual address. The segment and offset portions are concatenated to form the new virtual address which is then translated to a main store address. Overflow detection circuitry in the ALU detects if an overflow out of the offset occurs as a result of the ALU operation for obtaining the new offset value. If an overflow is detected during the calculation of the new offset value, translation of the virtual address is subsequently aborted.

13 Claims, 4 Drawing Figures

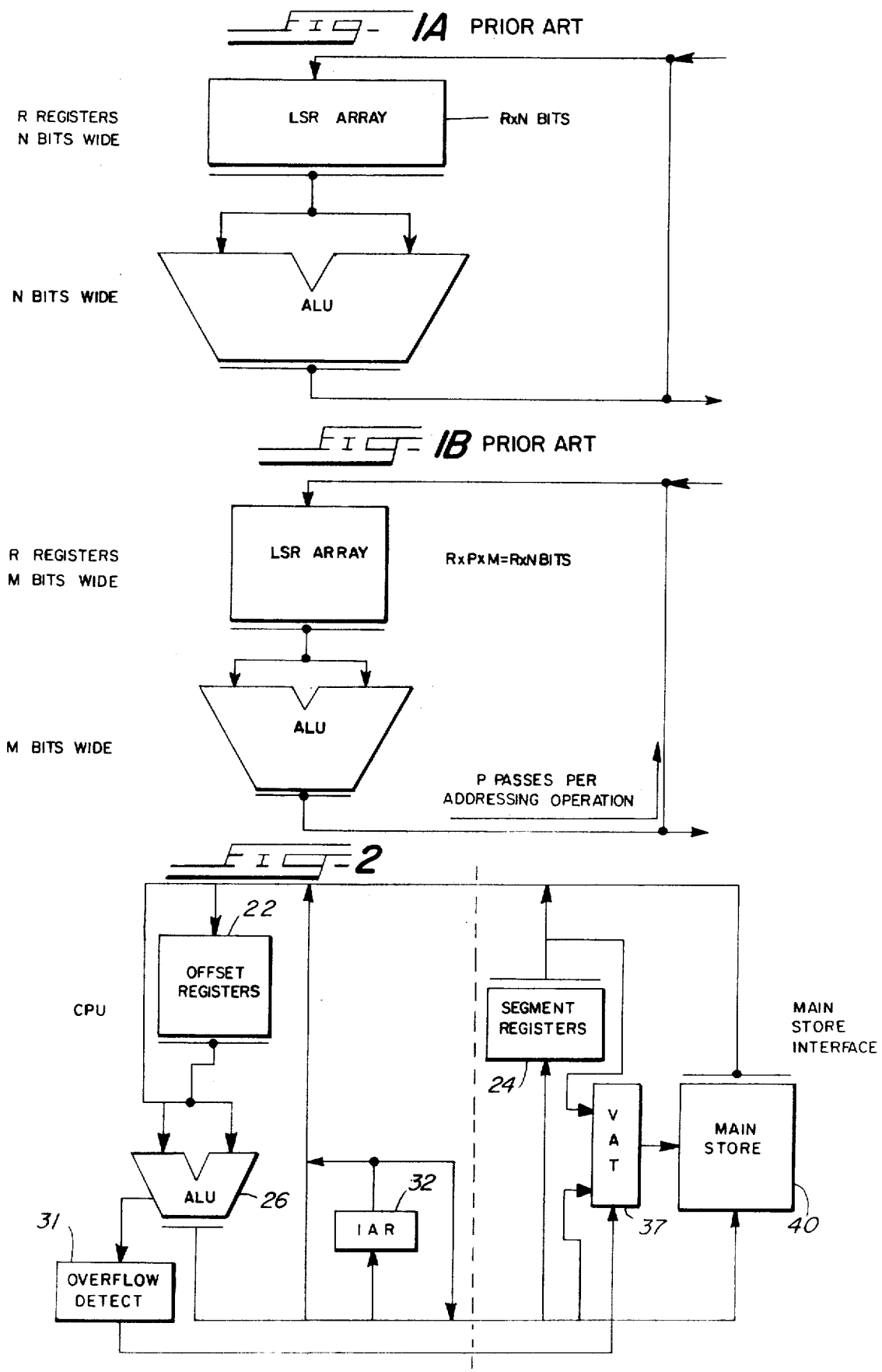

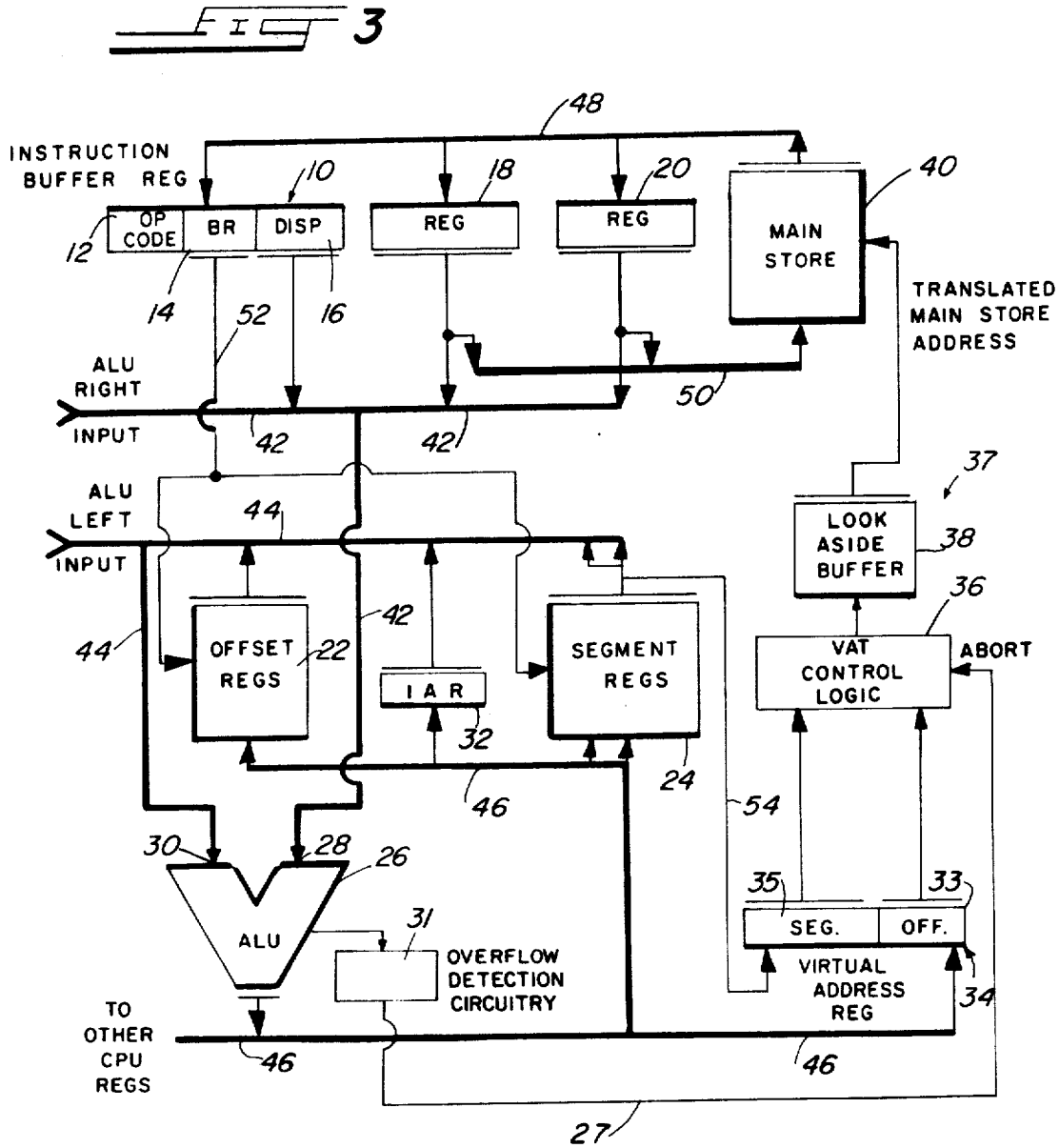

VIRTUAL ADDRESSING APPARATUS EMPLOYING SEPARATE DATA PATHS FOR SEGMENT AND OFFSET PORTIONS OF A VIRTUAL ADDRESS AND UTILIZING ONLY THE OFFSET PORTION TO CALCULATE VIRTUAL ADDRESS

DESCRIPTION

TECHNICAL FIELD

This invention relates to virtual address apparatus for a data processing system and, more particularly, to apparatus for splitting the base address registers containing large virtual addresses into segment registers and offset registers so as to eliminate the need for the segment portion of the virtual addresses to participate in arithmetic operations and to utilize a narrow data path for the central processing unit.

The invention finds particular utility in a small computer system having narrow data paths structured with virtual storage.

BACKGROUND ART

The advent of virtual storage for computer systems has increased the desirability of using a large virtual address. In addition to providing enough bits in an address to reference the main store, it is desirable to provide a single large address having sufficient bits to reference all of secondary storage, e.g., disks, drums, and bubble memories. In the past, large virtual addresses could only be implemented practically on systems having a central processing unit ("CPU") with wide data paths (i.e., wide enough to pass all of the bits in a large virtual address in parallel), a wide arithmetic and logic unit ("ALU"), and wide local storage register ("LSR") arrays. However, the cost of the hardware required for such an implementation is prohibitive for a small computer system. Therefore, the usual approach for implementation of a large virtual address on a small computer system is to provide narrow data paths, a narrow ALU, and narrow LSR arrays and to make multiple passes through the CPU in order to operate on addresses wider than the data paths, ALU, and LSR arrays. These multiple passes result in significant performance degradation, and consequently the implementation of a large virtual address on a small computer system by this approach is impractical.

The usual performance degradation resulting from the implementation of a large virtual address on a small computer system is eliminated by the present invention. Implementation of a large virtual address is facilitated by splitting the base address registers into segment registers and offset registers so as to eliminate the need for the segment portion of the virtual addresses to participate in arithmetic operations. Thus, narrow data paths (i.e., narrow in the sense that the data paths carry fewer bits of data simultaneoulsy in parallel), a narrow ALU, and narrow LSR arrays can be utilized in the CPU to implement a large virtual address on a small computer system without casing performance degredation.

The prior art, U.S. Pat. No. 3,938,096—Brown et al., discloses an address having a base segment and an offset within the segment. However, Brown et al. does not teach splitting the segment away from the offset so that only the offset participates in arithmetic operations to increment or decrement an address.

DISCLOSURE OF THE INVENTION

In order to provide support for program modularity, variable-size data structures, as well as protection and sharing of data and programs, virtual storage is generally divided into blocks of equal size called "segments". One of the characteristics of a segmented virtual storage system is that storage operands are referenced with a two-component address in which the first component, "S", identifies a segment of storage and the second component, "O", identifies an offset within S. The number of bytes in each segment determines the number of address bits in O. Typically, O will contain 16 bits providing a segment of 64 K bytes, and S will exceed O and contain at least 24 bits.

The present invention splits the base address registers into segment registers and offset registers, and stores the segment portion of a virtual address in a segment register and the offset portion of the virtual address in an offset register. This eliminates the need for the segment portion of the virtual address to participate in arithmetic operations to increment or decrement an address. Thus, in the present invention the data flow is divided into a portion associated with the CPU and another portion associated with the main store interface. The path for the portion of the data flow associated with the CPU consists of data paths, an ALU, and LSR arrays, all of which are the same width (i.e., capable of handling the same number of bits in parallel) as the ofset portion of the virtual address. The path for the data flow associated with the main store interface includes the virtual address translator control logic, which translates virtual addresses to real main store addresses, and segment registers which contain the segment portion of the virtual addresses.

In order to increment or decrement an address, including the instruction address contained in the instruction address register, the present invention provides apparatus such that only the offset portion of the virtual address is passed through the data path associated with the CPU. The offset is formed by adding the displacement from the instruction buffer register to the contents of a selected offset register. Overflow detection circuitry on the ALU detects if an overflow out of the offset portion of the segment occurs as a result of the operation and signals the appropriate address overflow exception. An overflow occurs when an attempt is made to address beyond a segment boundary and is considered an error condition in a segmented virtual storage structure.

In order to address data or instructions in the main store, the offset portion of the address is passed from the CPU to the virtual address translation hardware assembly. At the same time the segment portion of the virtual address is read out of the appropriate segment register and passed to the virtual address translation hardware assembly. The virtual address translation hardware assembly translates the full virtual address and causes the data to be written to or read from the main store.

Thus, with the present invention, addressing operations such as incrementing or decrementing are accomplished in a single cycle via the narrow CPU data path. Addressing the main store is also accomplished in a single cycle by passing the offset and segment portions of the virtual address in parallel. Therefore, the performance of the present invention using narrow data paths approaches the performance which would be possible with wide data paths.

The present invention provides a further cost savings since the segment registers and their associated circuitry can be implemented in a slower, less costly technology than is required for the offset registers. Consequently, the overall cost is reduced without significantly degrading the performance of the CPU.

Thus, it is a principal object of the present invention to provide an implementation for a large address in a small computer system while minimizing the width, and thus the hardware cost, of the CPU internal data paths, ALU, and LSR arrays needed to support a large virtual address without degrading performance.

It is another principal object of the present invention to provide for the implementation of a large portion of the CPU's address registers in a lower cost, lower performance array separate from the CPU data flow without impacting the overall performance of the CPU.

These and other objects, advantages, and features will hereinafter appear, and, for purposes of illustration, but not for limitation, exemplary embodiments of the present invention are illustrated in the accompanying drawings.

BRIEF DESCRIPTION OF DRAWINGS

FIG. 1A illustrates a wide data path implementation of a large virtual address in a prior art computer system.

FIG. 1B illustrates a narrow data path implementation of a large virtual address in a prior art computer system.

FIG. 2 illustrates the data flow of the present invention, which is divided into the CPU data flow and the main store interface data flow.

FIG. 3 shows an implementation of the present invention.

BEST MODE OF CARRYING OUT THE INVENTION

In the usual prior art implementaton of a CPU for a large virtual address, which is illustrated in FIG. 1A, the data paths, ALU, and LSR arrays must be as wide as the full virtual address. Since the hardware cost of such an implementation is prohibitive for a small computer system, the usual prior art approach for a small computer system is to use narrow data paths, ALU, and LSR arrays and to make multiple passes through the CPU to operate on wide virtual addresses, a illustrated in FIG. 1B. However, this approach results in significant performance degradation. The present invention achieves the performance of the prior art implementation illustrated in FIG. 1A for the hardware cost of the prior art implementation illustrated in FIG. 1B.

As illustrated by the dashed line in FIG. 2, the data flow of the present invention includes one portion associated with the CPU and another portion associated with the main store interface. In the present invention, large virtual addresses are split between a segment portion and an offset portion, with the bits in the segment portion of the virtual address being used to identify the segment and the bits in the offset portion being used to identify the byte within the segment. For example, a virtual address might contain a total of 40 bits of which 24 bits are used to identify the segment and 16 bits are used to identify the offset; that is, the particular byte within the segment. Thus, in one embodiment of the present invention, a complete virtual address can be stored in a 16 bit offset register plus a 24 bit segment register. The CPU data flow illustrated in FIG. 2 consists of offset registers 22, ALU 26, instruction address register 32, and the associated data paths, all of which need to be only as wide as the offset portion of the virtual address. The main store interface data flow illustrated in FIG. 2 consists of segment registers 24, virtual address translation ("VAT") hardware assembly 37 (hereinafter described in greater detail), and main store 40. Splitting the virtual address in this manner thus allows a narrower data path and ALU to be used, since the segment portion of the virtual address need not participate in arithmetic operations. Consequently, segment registers 24 and the associated circuity can be implemented in a slower, less costly technology than offset registers 22 and the circuitry associated therewith without significantly reducing the performance of the CPU.

An implementation of the present invention is shown in FIG. 3. In this embodiment, instruction buffer register 10 is used to buffer the bytes of the instruction currently being processed. Each instruction consists of two major parts: (1) an operation code, which designates the operation to be performed, and (2) the designation of the operands that participate. In this embodiment, the operation code is designated by the bits contained in field 12, and the operand is designated by the bits contained in base register ("BR") field 14 and displacement field 16. Data path 48 provides a path for data from main store 40 to instruction buffer register 10. Displacement field 16 is connected to ALU 26 via ALU right input data path 42. BR field 14 is connected to offset registers 22 and to segment registers 24 via common addressing means 52.

Storage buffer registers 18 and 20 are used to buffer data used during the execution of an instruction and are connected to main store 40 via data paths 48 and 50. Storage buffer registers 18 and 20 are also connected to ALU 26 via data path 42. Base addresses, which provide for addressing areas of main storage utilized for the execution of instructions, also are split into offset and segment portions. Thus, base address registers consist of offset registers 22 which comprise the offset portion of the base address registers, and segment registers 24 which comprise the segment portion of the base address registers. Offset registers 22 and segment registers 24 are connected to ALU 26 via ALU left input data path 44. It should be noted that if the segment portion is wider than offset registers 22 and ALU 26, multiple passes would be required to pass the contents of a segment register 24 through the CPU data path. Segment registers 24 are also connected to the segment portion of virtual address register ("VAR") 34 via data path 54, which is as wide as segment registers 24 and segment portion 35 of virtual address register 34.

ALU 26, which has right input 28 and left input 30, performs arithmetic and logical operations on one or two input operands. Data path 42 provides a path for data to ALU right input 28, and data path 44 provides a path for data to ALU left input 30. Data path 46 provides a path from the output of ALU 26 to offset portion 33 of virtual address register 34, segment registers 24, instruction address register ("IAR") 32, and offset registers 22. ALU 26, in conjunction with overflow detection circuitry 31, also provides the capability of detecting an offset overflow condition, hereinafter discussed in greater detail.

IAR 32, which also is narrower than the virtual address so as to accommodate the narrow CPU data flow, contains the address of the current instruction. During program execution, the instruction is fetched from the location designated by the instruction address in IAR 32 and entered into instruction buffer register 10. The instruction address is then passed to ALU 26 via ALU left input data path 44, incremented via ALU 26, and placed back in IAR 32 via data path 46 in order to address the next instruction in sequence. The instruction is then executed, and the same steps are repeated using the new value of the instruction address in IAR 32. The methods by which the computer system carries out the execution of programs is beyond the scope of the present invention.

Virtual address register 34 is used to assemble a full virtual address prior to translation to a main storage address by virtual address translation hardware assembly 37. Translation of the virtual address to a main storage address in main store 40 is necessary because the virtual address addresses a larger storage space than main store 40. Virtual address translation hardware assembly 37 is comprised of virtual address register 34, virtual address translation ("VAT") control logic 36, and lookaside buffer 38. Virtual address translation control logic 36 controls the address translation process. Lookaside buffer 38 provides translation of virtual addresses to main store addresses in conjunction with virtual address translation control logic 36. The use of virtual address translation apparatus and lookaside buffers is well known in the art and does not form a part of the present invention. Main store 40 contains both the instructions and operands used during execution of programs.

For purposes of illustrating the operation of the present invention, the execution of an instruction to fetch an operand from main store 40 will be described. It is assumed that an instruction has been fetched from main store 40 and placed into instruction buffer register 10. The instruction address in IAR 32 is incremented via ALU 26 and placed back into IAR 32. The operation code decode logic (not shown) determines that an operand is to be fetched from main store 40. It should be noted that the method by which the decode logic decodes the operation code in the instruction is not part of the present invention.

The address of the operand to be fetched from main store 40 is computed by ALU 26 by adding the contents of the offset portion of the base register designated in base register field 14 to the displacement value designated in displacement field 16 of the instruction contained in instruction buffer register 10. The base register designated in base register field 14 contains a full virtual address, with the offset contained in one of the offset registers 22 and the segment contained in one of the segment registers 24. Base register field 14 is used to select one of the offset registers 22, the contents of which are gated to left input 30 of ALU 26. Displacement field 16 from instruction buffer register 10 is simultaneously gated to right input 28 of ALU 26. An add operation is then performed by ALU 26 and the sum is gated into offset portion 33 of virtual address register 34. If an overflow is detected during the add operation by the overflow detecting means provided by ALU 26 and overflow detection circuitry 31, this event is signalled to virtual address translation control logic 36 via abort line 27 and the operation stops. Concurrently with these operations, base register field 14, which was used to select an offset register 22, is also used to select one of the segment registers 24. The contents of the selected segment register 24 are gated into segment portion 35 of virtual address register 34. Depending upon the relative performance of the hardware used to implement segment registers 24 and offset registers 22, some delay may be incurred before virtual address register 34 is fully loaded. Thus means are provided for concatenating a new offset portion which has been calculated with the segment portion to form the new virtual address in vritual address register 34. The full virtual address in virtual address register 34 is used by virtual address translation control logic 36 to select an entry in lookaside buffer 38, unless an overflow signal is received via abort line 27. An overflow signal on abort line 27 indicates that an offset overflow into another segment has occurred, which is an error condition by architectural definition, and causes the operation to be aborted. The selected entry in lookaside buffer 38 contains the translated main store address which is used to access main store 40. The data fetched from the address in main store 40 is gated into storage buffer register 18 or 20, thus completing the main store fetch operation.

While the preferred embodiment of the invention has been illustrated and described, it is to be understood that the invention is not to be limited to the precise construction herein disclosed, and the right is reserved to all changes and modifications coming within the scope of the invention as defined in the appended claims.

We claim:

1. Apparatus for forming a virtual address in a data processing system having main storage and a central processing unit, where the central processing unit includes a virtual address register having a segment portion and an offset portion for storing a virtual address, said virtual address including a segment portion and an offset portion, said apparatus comprising:

a plurality of offset registers;

a plurality of segment registers;

an instruction register for storing the instruction currently being executed, said instruction register storing a base register field of bits from the instruction for designating a full virtual address and a displacement field of bits from the instruction, the base register field of bits designating both one of said offset registers and one of said segment registers;

common addressing means for commonly addressing said offset registers and said segment registers, said common addressing means being connected to the base register field of bits in said instruction register, said common addressing means addressing the offset register and the segment register which are designated by said base register field of bits stored in said instruction register during the generation of a virtual address;

an arithmetic and logic unit having first and second inputs for receiving data and an output for providing the results of operations performed by said arithmetic and logic unit;

first connecting means for connecting said displacement field of bits of said instruction register to the first input of said arithmetic and logic unit;

second connecting means for connecting said offset registers to the second input of said arithmetic and logic unit, whereby the execution of an instruction by the data processing system causes said displacement field of bits to be gated to the first input of said arithmetic and logic unit via said first connecting means, the offset stored in the offset register designated by said base register field of bits and addressed by said common addressing means to be gated to the second input of said arithmetic and logic unit via said second connecting means, and said arithmetic and logic unit to perform an arithmetic or logical operation on the displacement and offset to produce a new offset portion of a virtual address at the output of said arithmetic and logic unit;

third connecting means for connecting the output of said arithmetic and logic unit to the offset portion of said virtual address register, the new offset portion of the new virtual address being transferred from the output of said arithmetic and logic unit to the offset portion of said virtual address register via said third connecting means; and fourth connecting means for connecting said segment registers to the segment portion of said virtual address register, the segment portion of the new virtual address being transferred from the segment register addressed by said common addressing means to the segment portion of said virtual address register via said fourth connecting means, whereby the new virtual address is formed in said virtual address register by concatenating the new offset portion with the segment portion stored in the segment register designated by said base register field of bits.

2. The apparatus as set forth in claim 1 wherein said segment registers are implemented in slower speed circuitry than said offset registers.

3. The apparatus as set forth in claim 1 further comprising:

a storage buffer register for buffering data used during the execution of an instruction;

fifth connecting means for connecting said storage buffer register to the main storage; and sixth connecting means for connecting said storage buffer register to said arithmetic and logic unit, whereby data used during the execution of an instruction contained in said instruction register is buffered in said storage buffer register until needed for an operation by said arithmetic and logic unit.

4. The apparatus as set forth in claim 1 further comprising:

an instruction address register, which is narrower than the virtual address register, for storing the main store address of the next instruction to be executed;

seventh connecting means for connecting said instruction address register to an input of said arithmetic and logic unit; and eighth connecting means for connecting the output of said arithmetic and logic unit to said instruction address register, said instruction address register having a width which is sufficiently narrow that the bits of the instruction address stored therein can be simultaneously passed through said seventh connecting means to said arithmetic and logic unit, incremented by said arithmetic and logic unit, and the incremented instruction address placed in said instruction address register via said eighth connecting means, whereby the instruction address stored in said instruction address register is incremented in order to address the next instruction to be executed in sequence.

5. The apparatus as set forth in claim 1 further comprising virtual address translation means for translating a virtual address stored in said virtual address register to a main store address.

6. The apparatus as set forth in claim 5 further comprising:

overflow detecting means for detecting an overflow condition when said arithmetic and logic unit combines the offset from the offset register designated by the base register field of bits in said instruction register with the displacement given by said displacement field of bits in said instruction register; and inhibit means for inhibiting operation of said virtual address translation means in response to detection of an overflow by said overflow detecting means, whereby translation of the virtual address in the virtual address register by said virtual address translation means is aborted when an overflow condition has been detected.

7. The apparatus as claimed in claim 1 wherein the segment portion of the virtual address is wider than the offset portion of the virtual address.

8. The apparatus as set forth in claim 5 wherein said virtual address translation means is comprised of virtual address translation control logic means for controlling the address translation process and lookaside buffer means for translating the virtual address in said virtual address register to a main store address.

9. Apparatus for forming a virtual address in a data processing system having main storage and a central processing unit, where the central processing unit includes a virtual address register having a segment portion and an offset portion for storing a virtual address, said virtual address including a segment portion and an offset portion, said apparatus comprising:

a plurality of offset registers;

a plurality of segment registers;

an instruction register for storing the instruction currently being executed, said instruction register storing a base field of instruction bits for designating one of said offset registers and one of said segment registers, said instruction register also storing a displacement field of instruction bits;

an arithmetic and logic unit having first and second inputs for receiving data and an output for providing the results of operations performed by said arithmetic and logic unit;

common addressing means for addressing said offset registers and said segment registers, said common addressing means addressing the offset register and the segment register which are designated by the base field of bits stored in said instruction register during the generation of a virtual address;

first connecting means for connecting the displacement field of bits in said instruction register to the first input of said arithmetic and logic unit, whereby during the generation of a virtual address the displacement field of instruction bits is gated to the first input of said arithmetic and logic unit;

second connecting means for connecting said offset registers to the second input of said arithmetic and logic unit, whereby during the generation of a virtual address the offset portion contained in the offset register addressed by said common addressing means is gated to the second input of said arithmetic and logic unit;

third connecting means for connecting the output of said arithmetic and logic unit to the offset portion of said virtual address register, whereby during the generation of a virtual address, the new offset obtained by an arithmetic and logical operation performed by said arithmetic and logic unit on the displacement field of instruction bits and the offset portion is gated to the offset portion of said virtual address register;

fourth connecting means for connecting the output of said segment registers to the segment portion of said virtual address register, the segment portion of the new virtual address being gated from the segment register addressed by said common addressing means to the segment portion of said virtual address register via said fourth connecting means, whereby the new virtual address is formed in said virtual address register by concatenating the new offset portion with the segment portion stored in the segment register designated by the base register field of instruction bits;

virtual address translation means for translating a virtual address formed in said virtual address register to a main store address;

overflow detecting means for detecting if an overflow has occurred in response to said arithmetic and logic unit performing an operation on the displacement field of instruction bits and the offset portion; and inhibit means for inhibiting operation of said virtual address translation means when an overflow is detected by said overflow detecting means, whereby the translation of the new virtual address to a main store address is aborted when an overflow has been detected.

10. Apparatus for forming a virtual address in a computer system having main storage and a central processing unit where the central processing unit includes a virtual address register having a segment portion and an offset portion for storing a virtual address, said virtual address including a segment portion and an offset portion, said apparatus comprising:

a plurality of offset registers;

a plurality of segment registers;

an instruction register for storing the instruction currently being executed, said instruction register having a base register portion and having a base field of instruction bits stored in the base register portion, said instruction register also having a displacement register portion and having a displacement field of instruction bits stored in the displacement register portion;

an arithmetic and logic unit for forming a new offset portion of a virtual address, said arithmetic and logic unit having first and second inputs for receiving data and an output for providing the results of operations performed by said arithmetic and logic unit;

common addressing means for addressing said offset registers and said segment registers, said common addressing means addressing the offset register and the segment register which are designated by the base field of bits stored in said instruction register during the generation of a virtual address;

first connecting means for connecting the displacement portion of said instruction register to the first input of said arithmetic and logic unit, whereby during the generation of a virtual address the displacement field of instruction bits is gated to the first input of said arithmetic and logic unit;

second connecting means for connecting said offset registers to the second input of said arithmetic and logic unit, whereby during the generation of a virtual address the offset portion contained in the offset register addressed by said common addressing means is gated to the second input of said arithmetic and logic unit;

third connecting means connecting the output of said arithmetic and logic unit to the offset portion of said virtual address register for transferring the new offset formed by said arithmetic and logic unit combining the offset portion gated to its second input with the displacement field of instruction bits gated to its first input from the output of said arithmetic and logic unit to the offset portion of said virtual address register;

fourth connecting means connecting said segment registers to the segment portion of said virtual address register for transferring the segment portion contained in the segment register addressed by said common addressing means to the segment portion of said virtual address register, whereby a new virtual address is formed by combining, in an operation performed by said arithmetic and logic unit, the displacement field of instruction bits with the offset stored in the offset register designated by the base field of instruction bits to obtain a new offset portion which is concatenated with the segment portion stored in the segment register also designated by the base field of instruction bits to form a new virtual address;

an instruction address register for storing the main store address of the next instruction to be executed;

fifth connecting means for connecting said instruction address register to an input of said arithmetic and logic unit;

sixth connecting means for connecting the output of said arithmetic and logic unit to said instruction address register, whereby the instruction address stored in said instruction address register is incremented in order to address the next instruction in sequence;

virtual address translation means for translating the virtual address in said virtual address register to a main store address, overflow detecting means for detecting an overflow in response to said arithmetic and logic unit combining the contents of a selected offset register with the displacement portion of said instruction register to form a new offset portion; and inhibit means for inhibiting operation of said virtual address translation means when an overflow is detected by said overflow detecting means, whereby the translation of the new virtual address to a main store address is aborted when an overflow has been detected.

11. Apparatus for forming a virtual address in a data processing system having main storage and a central processing unit, where the central processing unit includes a virtual address register having an offset portion and a segment portion for storing a virtual address having an offset portion and a segment portion, and where separate data paths are provided for the offset portion and segment portion of a virtual address, said apparatus comprising:

offset register means for storing the offset portions of virtual addresses;

segment register means for storing the segment portions of virtual addresses;

an instruction register for storing an instruction to be executed, said instruction register having a base portion for storing a base portion of the instruction and a displacement portion for storing a displacement portion of the instruction;

common addressing means for addressing said offset register means and said segment register means according to the base portion of the instruction stored in said instruction register to select an offset portion and a segment portion of a virtual address;

arithmetic and logic unit means for combining the offset portion selected by said common addressing means with the diplacement portion of the instruction stored in said instruction register to form a new offset portion; and concatenating means for concatenating the new offset portion formed by said arithmetic and logic unit means with the segment portion selected by said common addressing means to form a new virtual address, whereby a new virtual address is formed having the same segment portion as the virtual address selected by said common addressing means but a new offset portion.

12. The apparatus as set forth in claim 11 further comprising:

virtual address translation means for translating the new virtual address formed by said concatenating means to a main store address.

13. The apparatus as set forth in claim 12 further comprising:

overflow detecting means for detecting an overflow condition when said arithmetic and logic unit means combines the offset portion with the displacement portion to form a new offset portion that is outside of the segment; and inhibit means for inhibiting operation of said virtual address translation means in response to detection of an overflow condition by said overflow detecting means, whereby translation of the new virtual address by said virtual address translation means is aborted when an overflow condition has been detected.

* * * * *